United States Patent [19]
Maruno et al.

[11] Patent Number: 5,606,538
[45] Date of Patent: Feb. 25, 1997

[54] LEARNING TYPE SIGNAL RECORDING AND REPRODUCING APPARATUS

[75] Inventors: Susumu Maruno, Osaka; Toshiyuki Kouda, Nara; Taro Imagawa, Kadoma, all of Japan

[73] Assignee: Matsushita Electric Industrial Co., Ltd., Kadoma, Japan

[21] Appl. No.: 614,102

[22] Filed: Mar. 12, 1996

Related U.S. Application Data

[63] Continuation of Ser. No. 441,396, May 15, 1995, abandoned.

[30] Foreign Application Priority Data

May 18, 1994 [JP] Japan .................................. 6-103841

[51] Int. Cl.⁶ ........................................................ G11B 7/00
[52] U.S. Cl. .......................... 369/48; 369/54; 369/58; 369/59; 369/60; 369/124; 395/22
[58] Field of Search ................................ 369/47, 48, 49, 369/50, 53, 54, 58, 59, 60, 32, 124, 44.34, 44.36, 44.29; 395/22, 23, 24, 11

[56] References Cited

U.S. PATENT DOCUMENTS

| | | | |
|---|---|---|---|
| 5,265,224 | 11/1993 | Maruno | 395/24 |
| 5,295,130 | 3/1994 | Tobita et al. | 369/124 |
| 5,333,125 | 7/1994 | Yamamoto | 369/44.29 X |
| 5,333,240 | 7/1994 | Matsumoto et al. | 395/22 X |

FOREIGN PATENT DOCUMENTS

| | | |
|---|---|---|
| 0491301 | 6/1992 | European Pat. Off. . |
| 0498574 | 8/1992 | European Pat. Off. . |
| 0567983 | 11/1993 | European Pat. Off. . |

OTHER PUBLICATIONS

Search Report for European Appl. 95107524.1, mailed Feb. 15, 1996.

*Primary Examiner*—Muhammad N. Edun
*Attorney, Agent, or Firm*—Renner, Otto, Boisselle, Sklar

[57] ABSTRACT

The signal recording and reproducing apparatus of this invention includes: a signal detector for detecting a teacher signal and an information signal recorded on a recording medium; a converting section for converting the teacher signal and the information signal detected by the signal detector into a reproduction teacher signal and a reproduction information signal, respectively, based on a predetermined conversion rule; and a teacher signal generator for generating a reference teacher signal, wherein the teacher signal is first detected before the detection of the information signal, and the converting means includes a learning type waveform converting section for automatically establishing the predetermined conversion rule based on the reproduction teacher signal and the reference teacher signal.

19 Claims, 8 Drawing Sheets

LEARNING TYPE SIGNAL RECORDING AND REPRODUCING APPARATUS this is a continuation of application Ser. No. 08/441,396, filed on May 15, 1995 now abandoned.

BACKGROUND OF THE INVENTION

1. Field of the Invention

The present invention relates to a learning type signal recording and reproducing apparatus for recording/reproducing a signal on/from a recording medium such as an optical disk, a magneto-optic disk, a magnetic disk, and a magnetic tape.

2. Description of the Related Art

As one of the prior art techniques for reproducing a signal recorded on an optical disk, a magnetic disk, a magnetic tape, and the like, an apparatus which converts a detected signal into "0" or "1" based on a predetermined threshold and outputs the result as a reproduction signal has been proposed.

Figure 8:
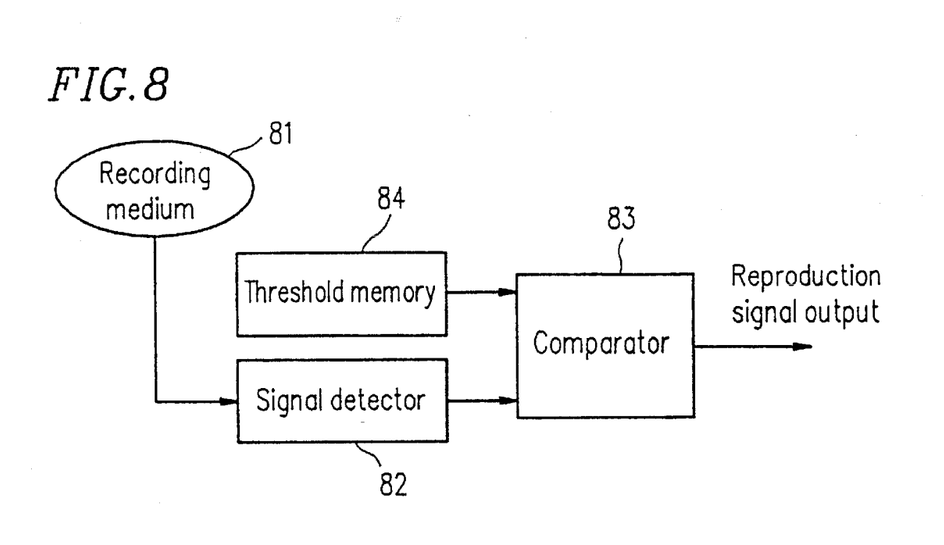
FIG. 8 is a block diagram of a conventional signal recording and reproducing apparatus.

The configuration of such a conventional signal recording and reproducing apparatus is schematically shown in FIG. 8. Referring to FIG. 8, a signal recorded on a recording medium 81 is detected by a signal detector 82. The signal detector 82 is connected to a comparator 83, to which a threshold memory 84 is also connected. The signal detected by the signal detector 82 is input into the comparator 83, and compared with a threshold read from the threshold memory 84 by the comparator 83. The comparator 83 outputs "1" when the signal from the signal detector 82 is greater than the threshold or "0" when it is smaller than the threshold as a reproduction signal. In this way, the conventional signal recording and reproducing apparatus can provide stable signal reproduction which is not influenced by signal distortion due to noise and the like.

Figure 9:
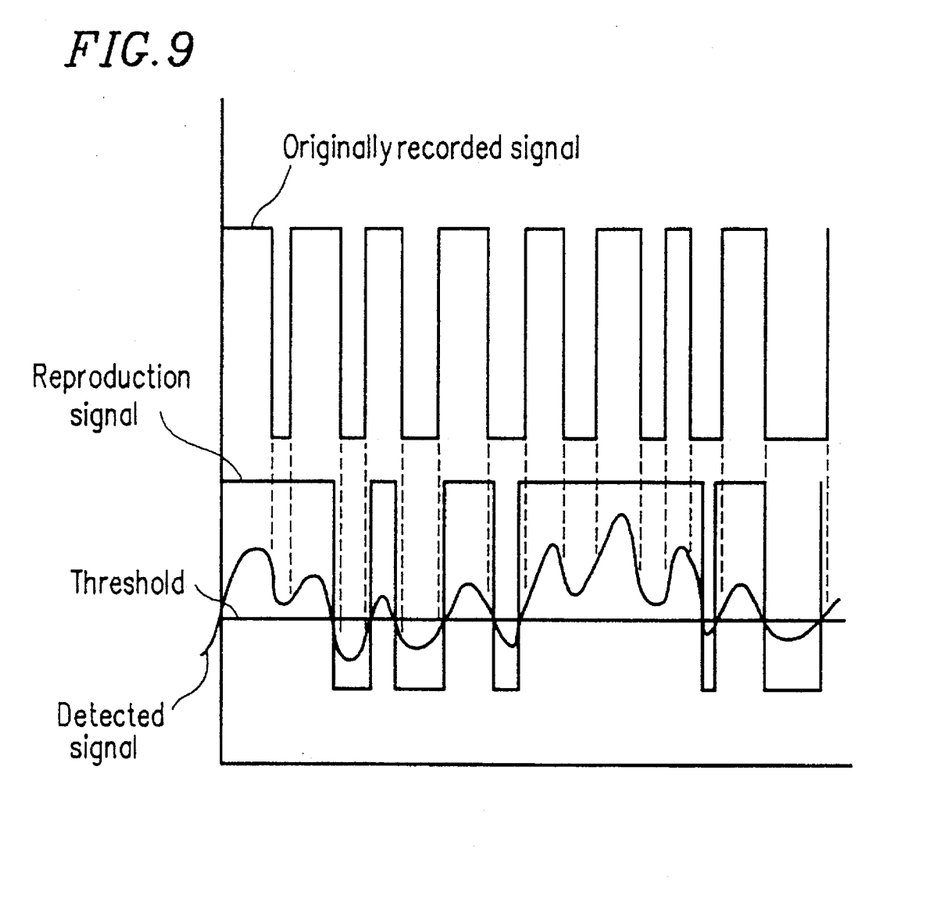
FIG. 9 is a waveform diagram showing the threshold processing of a waveform signal input into the conventional signal recording and reproducing apparatus.

However, the conventional signal recording and reproducing apparatus has a disadvantage as follows: When a signal having irregular waves as shown in FIG. 9 is input into the comparator 83 from the signal detector 82, for example, a wrong reproduction signal may be output in some cases. This wrong signal reproduction may be caused when the signal detected by the signal detector 82 includes noise or may be caused by various factors such as the difference between recording media used and the difference in the conditions under which the signal detection is performed.

SUMMARY OF THE INVENTION

The signal recording and reproducing apparatus of this invention, includes: signal detecting means for detecting a teacher signal and an information signal recorded on a recording medium; converting means for converting the teacher signal and the information signal detected by the signal detecting means into a reproduction teacher signal and a reproduction information signal, respectively, based on a predetermined conversion rule; and teacher signal generating means for generating a reference teacher signal, wherein the teacher signal is first detected before the detection of the information signal, and the converting means includes a learning type waveform converting section for automatically establishing the predetermined conversion rule based on the reproduction teacher signal and the reference teacher signal.

In one embodiment, the converting means includes memory means for storing the predetermined conversion rule established by the learning type waveform converting section.

In another embodiment, the converting means further includes a series signal extracting section for extracting a variation in a signal value at various points on a transition axis of the detected teacher signal and outputting the extracted variation in the signal value as series signals, and a memory control section for controlling the storage of the predetermined conversion rule in the memory means, and the learning type waveform converting section automatically establishes the predetermined conversion rule by learning the relationship between the extracted variation in the signal value and the waveform of the reference teacher signal.

In still another embodiment, when another conversion rule has been stored in the memory means, the learning type waveform converting section converts the detected teacher signal into the reproduction teacher signal in accordance with the conversion rule stored in the memory means, and establishes the predetermined conversion rule based on the reproduction teacher signal and the reference teacher signal.

In still another embodiment, when another conversion rule has been stored in the memory means, the conversion rule is loaded by the memory control section, the detected teacher signal is converted into the reproduction teacher signal in accordance with the conversion rule, and the predetermined conversion rule is established based on the reproduction teacher signal and the reference teacher signal.

In still another embodiment, the converting means further includes comparing means for comparing the reproduction teacher signal and the reference teacher signal, and the memory means stores the predetermined conversion rule when the reproduction teacher signal and the reference teacher signal are substantially the same.

In still another embodiment, the learning type waveform converting section includes a network having a plurality of layers, at least one of the plurality of layers including a plurality of first recognition units each having: a signal input section for receiving one of the series signals; a quantizer for receiving and quantizing the one of the series signals from the signal input section; at least one first path input terminal; at least one first path output terminal connected to the at least one first path input terminal; and a path selecting section for selecting a path by changing a degree of a connection between the at least one first path input terminal and the at least one first path output terminal in accordance with the quantized one of the series signals, a layer immediately before an output layer of the plurality of layers including a plurality of second recognition units each having: a teacher signal input terminal for receiving the reference teacher signal; at least one second path input terminal; at least one second path output terminal connected to the at least one second path input terminal; and a path learner for changing a strength of a connection between the at least one second path input terminal and one of the at least one second path output terminal specified by the reference teacher signal, and the learning type waveform converting section further includes an output result judging section for detecting a recognition unit having a largest output value among a plurality of third recognition units included in the output layer of the plurality of layers.

In still another embodiment, the series signal extracting section includes: a current signal extracting section for extracting a signal value at a predetermined point on the transition axis of the teacher signal; and a variation extracting section for calculating the difference between the signal value at the predetermined point extracted by the current signal extracting section and a signal value of the teacher signal at a point before the predetermined point.

In still another embodiment, the learning type waveform converting section includes a network made of a plurality of layers each having a plurality of units, and the predetermined conversion rule is established by changing a strength of a connection between adjacent layers among the plurality of layers by a learning operation performed by use of the reproduction teacher signal and the reference teacher signal.

In still another embodiment, the learning type converting section includes a network made of a plurality of layers each having a plurality of units, and the predetermined conversion rule is established by changing a degree of a connection between adjacent layers among the plurality of layers by a learning operation performed by use of the reproduction teacher signal and the reference teacher signal.

In still another embodiment, the predetermined conversion rule is stored in the memory means as the degree of the connection between the adjacent layers.

In still another embodiment, the degree of the connection between the adjacent layers is changed by changing a strength of a connection between a unit included in one of the adjacent layers and a unit included in the other layer.

In still another embodiment, the network of a plurality of layers has first, second, third, and fourth layers arranged in this order, the first layer receives the detected teacher signal, the fourth layer outputs the reproduction teacher signal, and the reference teacher signal is supplied to a unit included in the third layer, whereby the strength of the connection between the unit included in the third layer and a unit included in the fourth layer is changed.

In still another embodiment, the strength of the connection between the unit included in the third layer and the unit included in the fourth layer is changed so that the reproduction teacher signal and the reference teacher signal are substantially the same.

In still another embodiment, when data is to be recorded on the recording medium, the reference teacher signal generated by the teacher signal generating means is first recorded before the recording of the data.

In still another embodiment, the degree of the connection between the at least one second path input terminal and the at least one second path output terminal in the plurality of second recognition units of the learning type waveform converting section is stored in the memory means as the predetermined conversion rule.

In still another embodiment, the series signal extracting section generates further series signals by extracting a variation in a signal value at various points on a transition axis of the detected information signal, when the information signal is detected, the memory control section of the learning type waveform converting section loads the predetermined conversion rule stored in the memory means, and in each of the plurality of first recognition units, the signal input section receives one of the further series signals, the quantizer quantizes the one of the further series signals, and the path setting section changes the connection between the at least one first path input terminal and the at least one first path output terminal in accordance with the quantized one of the further series signal, while in each of the plurality of second recognition units, the at least one second path input terminal and the at least one second path output terminal are connected in a degree indicated by the predetermined conversion rule, whereby the information signal is converted into the reproduction information signal in accordance with the predetermined rule.

Thus, in the learning type signal recording and reproducing apparatus of the present invention, a reference teacher signal having a predetermined waveform is recorded on a header portion, for example, of a recording medium before data proper is recorded on the recording medium. The reference teacher signal is generated by the teacher signal generator of the learning type signal recording and reproducing apparatus of the present invention. When data is reproduced from the recording medium on which the reference teacher signal has been recorded, the signal detector of the learning type signal recording and reproducing apparatus first detects the teacher signal recorded on the header portion of the recording medium. Then, the learning type waveform converting section learns the relationship between the detected result and the reference teacher signal output from the teacher signal generator. By this learning, the learning type waveform converting section automatically establishes a conversion rule for converting the analog signal detected from the recording medium into the originally recorded signal.

When the learning is finished, the signal recorded on the recording medium is converted in accordance with the established conversion rule. Thus, the learning type signal recording and reproducing apparatus of the present invention can reproduce a signal stably without the influence of noise or the difference between the recording media used.

The conversion rule established by the learning is stored in the nonvolatile memory. At next reproduction, the learning type waveform converting section first loads the conversion rule from the nonvolatile memory, and then learns the relationship between the signal obtained by converting the teacher signal recorded on the header portion in accordance with the conversion rule and the reference teacher signal output from the teacher signal generator. As a result, at and from the next reproduction, the learning can be finished faster, the and thus start-up time of the signal recording and reproducing apparatus can be made significantly shorter. The conversion rule stored in the nonvolatile memory is renewed every time it is modified.

Thus, the invention described herein makes possible the advantage of providing a signal recording and reproducing apparatus capable of reproducing a signal stably without the influence of noise, the difference between recording media used, and the like.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of example with reference to the accompanying drawings.

Figure 1A:
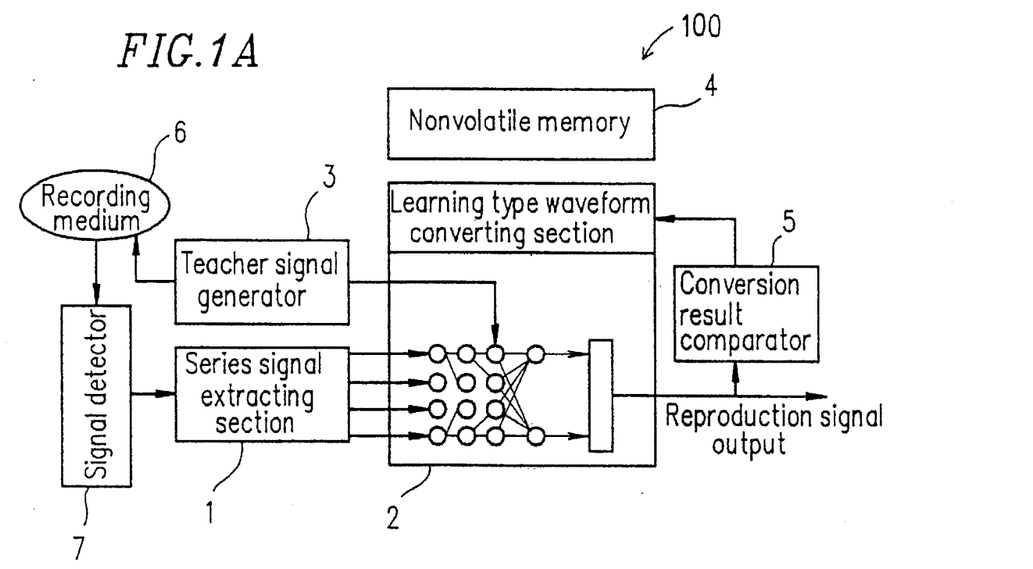
FIG. 1A is a block diagram showing a learning type signal recording and reproducing apparatus according to the present invention.

FIG. 1A is a block diagram showing the configuration of a learning type signal recording and reproducing apparatus 100 according to the present invention. The learning type signal recording and reproducing apparatus 100 does not reproduce a signal by merely comparing a signal detected by a signal detector with a threshold, but reproduces a signal by converting a detected signal in accordance with a conversion rule established by learning. The conversion rule can be modified by later learning as will be described later.

The learning type signal recording and reproducing apparatus 100 includes a series signal extracting section 1, a learning type waveform converting section 2, a teacher signal generator 3, a nonvolatile memory 4, a conversion result comparator 5, and a signal detector 7. The series signal extracting section 1 extracts a variation in the signal level at various time points of an analog signal detected by the signal detector 7 which successively detects a signal recorded on a recording medium 6, and outputs the results to the learning type waveform converting section 2.

The learning type waveform converting section 2 receives not only the output from the series signal extracting section 1 but also a reference teacher signal having a predetermined waveform generated by the teacher signal generator 3. When the signal detected by the signal detector 7 is a signal which has been recorded on the recording medium 6 based on the reference teacher signal, the learning type waveform converting section 2 learns the relationship between the variation in the signal level of the detected signal and the reference teacher signal generated from the teacher signal generator 3. Based on this learning, a conversion rule for reproducing the signal originally recorded on the recording medium 6 from the signal detected from the recording medium 6, i.e., a rule for converting the detected signal into "0" or "1" is automatically established by the learning type waveform converting section 2. On the other hand, when the signal detected by the signal detector 7 is a signal corresponding to normal data, the learning type waveform converting section 2 converts the detected signal into the originally recorded signal in accordance with the established conversion rule. The established conversion rule is stored in the nonvolatile memory 4.

The operation of the learning type signal recording and reproducing apparatus 100 with the above configuration will be described in detail.

Figure 1B:
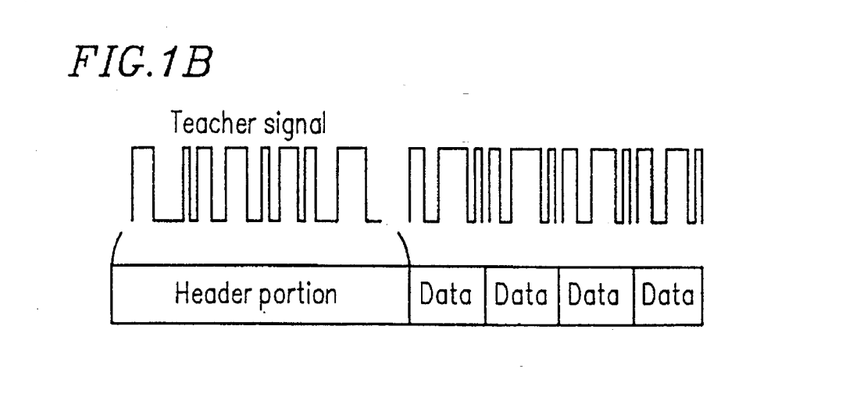
FIG. 1B shows the status of a signal recorded by use of the learning type signal recording and reproducing apparatus.

When data is to be recorded on the recording medium 6 by use of the apparatus 100 shown in FIG. 1A, the reference teacher signal generated by the teacher signal generator 3 is first recorded on a header portion, for example, of the recording medium 6 as shown in FIG. 1B prior to the recording of the data.

When a signal is to be reproduced from the recording medium 6 on which the reference teacher signal has been recorded, the learning type waveform converting section 2 first accesses the nonvolatile memory 4. If a conversion rule is stored in the nonvolatile memory 4, the learning type waveform converting section 2 loads the conversion rule. Then, the teacher signal recorded on the header portion of the recording medium 6 is detected by the signal detector 7, and the detected signal is supplied to the series signal extracting section 1 where a variation in the signal level of the detected signal is extracted.

The learning type waveform converting section 2 converts the detected signal based on the variation in the level of the detected signal and the conversion rule. In the case where no conversion rule is stored in the nonvolatile memory 4 nor loaded therefore into the learning type waveform converting section 2, an initial conversion rule before learning is used. The converted signal is output from the learning type waveform converting section 2 as a reproduction signal.

Subsequently, the conversion result comparator 5 compares the reproduction signal with the reference teacher signal. When the reproduction signal and the reference teacher signal are the same, the conversion rule used for the conversion is maintained in the nonvolatile memory 4 without any change. If the pre-learning initial conversion rule has been used for the conversion, this initial conversion rule is stored in the nonvolatile memory 4 as a conversion rule to be loaded at the next reproduction of a signal. When the reproduction signal and the reference teacher signal are not the same, the relationship between the variation in the level of the teacher signal detected from the header portion of the recording medium and the reference teacher signal generated by the teacher signal generator 3 is learned by the learning type waveform converting section 2. A rule obtained by the learning is then stored in the nonvolatile memory 4 as a new conversion rule. In other words, the conversion rule is modified by the learning and renewed in the nonvolatile memory 4.

Once the conversion rule is modified and renewed, the learning type waveform converting section 2 converts the detected signal into "0" or "1" in accordance with the new conversion rule, and outputs the result as a reproduction signal. As a result, according to the signal recording and reproducing apparatus of the present invention, an originally recorded signal can be stably reproduced even if the detected signal has a distortion due to noise, the difference between the recording media used, and the like.

Next, the major components of the learning type signal recording and reproducing apparatus 100 will be described in detail.

Figure 2:
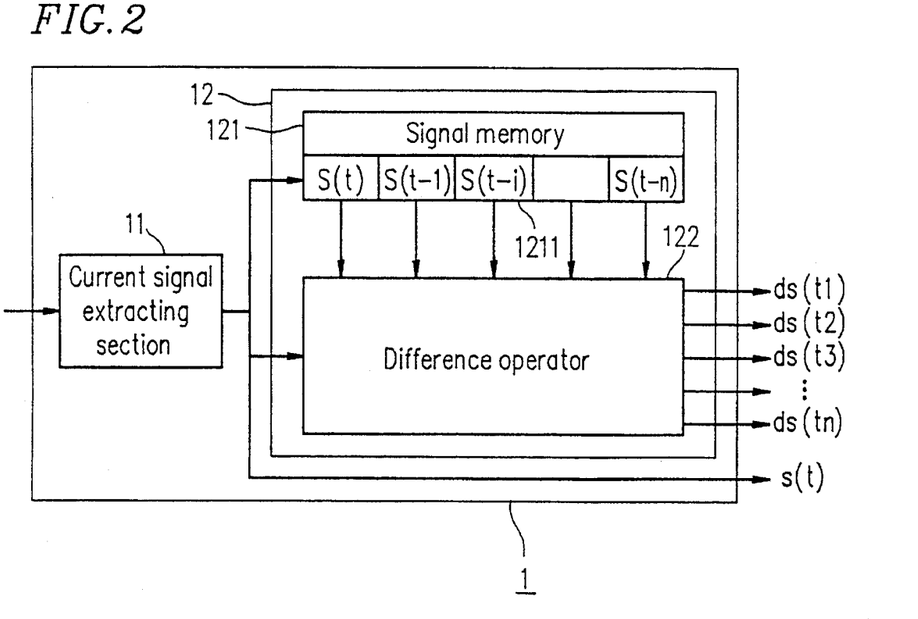
FIG. 2 shows an example of a series signal extracting section of the learning type signal recording and reproducing apparatus of the present invention.

FIG. 2 schematically shows the configuration of the series signal extracting section 1. The series signal extracting section 1 includes a current signal extracting section 11 and a variation extracting section 12. The current signal extracting section 11 receives an analog signal detected by the signal detector 7, extracts the wave height, i.e., the level of the signal, and outputs the result to the variation extracting section 12. The variation extracting section 12 includes a signal memory 121 and a difference operator 122. The signal memory 121 has n+1 signal memory units 1211 and successively stores signal levels (signal values) at points within a predetermined range of a transition axis of the detected analog signal (waveform signal), i.e., at various time points within a predetermined time period. The difference operator 122 calculates the difference between the signal value of the current analog signal extracted by the current signal extracting section 11 and each of the signal values stored in the signal memory 121.

More specifically, when an analog signal is input into the series signal extracting section 1, the current signal extracting section 11 extracts each wave height (signal value) of the analog signal, and successively outputs the result to both the signal memory 121 and the difference operator 122 of the variation extracting section 12. The signal memory 121 stores the signal values successively input thereto in the signal memory units 1211 by displacing the memory position for each signal value just as is done by a shift register. Accordingly, when a signal value s(t) extracted at a time t is input into the signal memory 121 from the current signal extracting section 11, a total of n+1 signal values s(t) to s(t−n) at maximum have been stored in the signal memory 121 as shown in FIG. 2.

The difference operator 122 calculates the difference ds(ti) between the signal value s(t) supplied from the current signal extracting section 11 at the time t and the signal value s(t−i) (i≠t) stored in the signal memory 121 in accordance with formula (1) below, so as to output n−1 difference values ds(t1) to ds(tn) at maximum.

$$ds(ti)=s(t)-s(t-i) \quad (1)$$

In this way, the series signal extracting section 1 outputs a series of signals composed of the current signal value s(t) extracted by the current signal extracting section 11 and the difference values ds(t1) to ds(tn) calculated by the variation extracting section 12 to the learning type waveform converting section 2.

Figure 3:
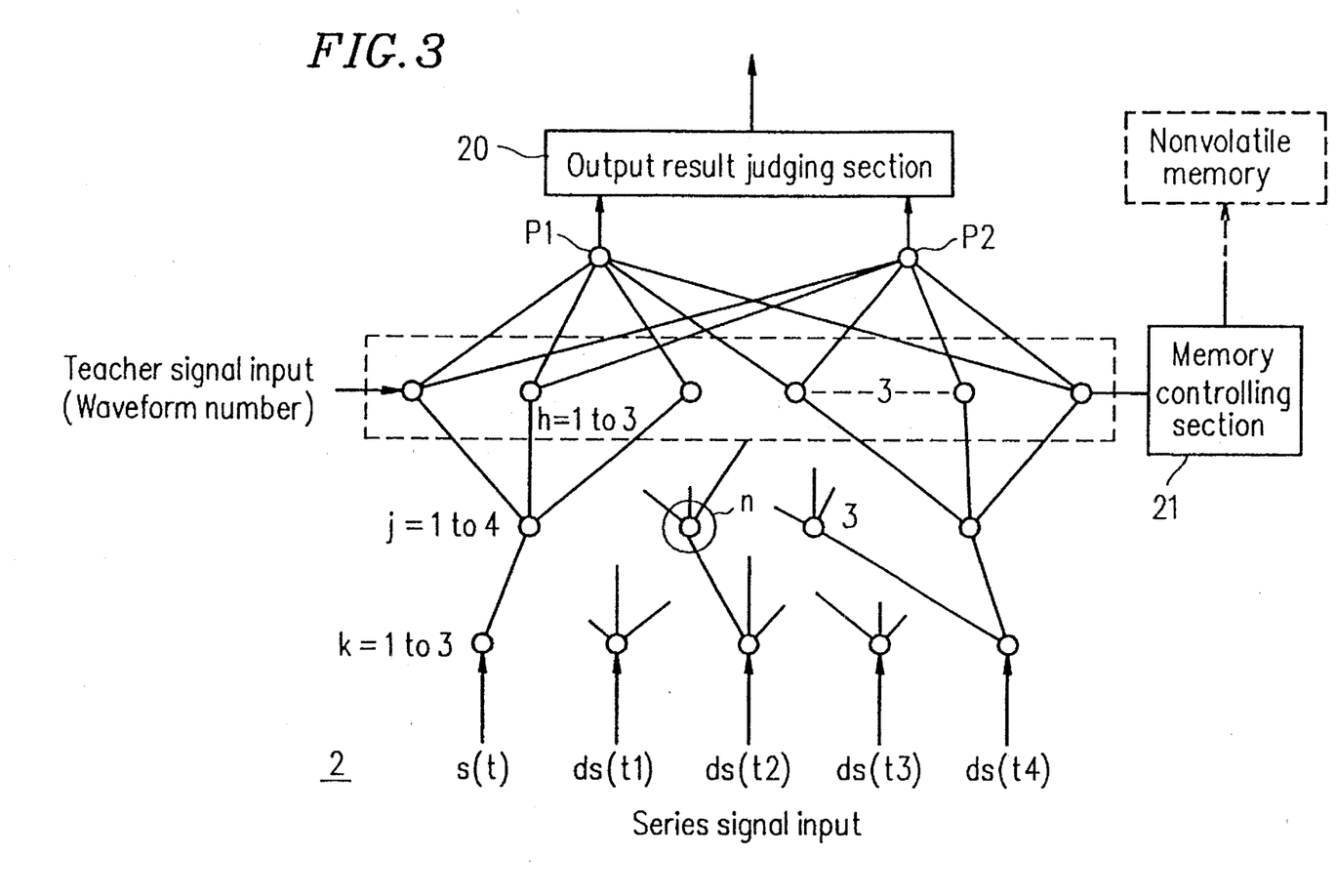
FIG. 3 schematically shows an example of a learning type waveform converting section of the learning type signal recording and reproducing apparatus of the present invention.

Next, the configuration and the operation of the learning type waveform converting section 2 will be described.

FIG. 3 schematically shows the configuration of the learning type waveform converting section 2. Herein, it is assumed that the series of signals output from the series signal extracting section 1 are composed of five signals s(t) and ds(t1) to ds(t4). In this example, the learning type waveform converter 2 includes a hierarchical network having four layers composed of a plurality of recognition units n. This type of network is disclosed, for example, in U.S. Pat. No. 5,265,224. The learning type waveform converting section 2 first receives the series of signals so that they are input into the recognition units of the first layer of the network one by one, and finally determines whether the waveform of the detected signal at time t is "0" or "1". The fourth layer of the network includes recognition units p1 and p2 which are connected with the output terminals of all recognition units of the third layer. The recognition units p1 and p2 output the degree of probability of being "0" and the degree of probability of being "1", respectively, to an output result judging section 20. The output result judging section 20 compares the received values, and outputs "0" when the output value of the unit p1 is greater than the output value of the unit p2 and otherwise outputs "1" as the final result.

The number of recognition units constituting the first layer of the network is the same as the number of signals of one series output from the series signal extracting section 1. Since five series signals s(t) and ds(t1) to ds(t4) are used in this example, the first layer is composed of five recognition units.

A memory control section 21 is connected to the third layer of the four-layer network. The memory control section 21 serves to load or store the weight of the connection between the output terminal of each recognition unit of the third layer and the input terminal of each of the recognition units p1 and p2 from or into the nonvolatile memory 4.

The configuration of the recognition unit of the second layer of the network will be described in detail with reference to FIGS. 4 and 5.

Figure 4:
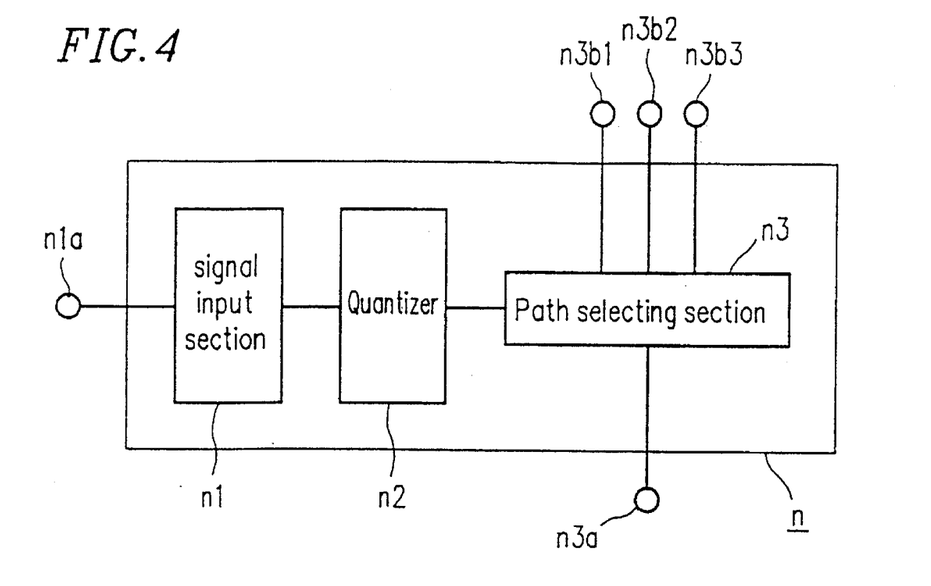
FIG. 4 schematically shows an example of a recognition unit of a second layer of the learning type waveform converting section of the learning type signal recording and reproducing apparatus of the present invention.

FIG. 4 schematically shows the configuration of a recognition unit n included in the second layer. All of the recognition units of the second layer have the configuration shown in FIG. 4. The recognition unit n has a signal input section n1, a quantizer n2, and a path selecting section n3. The signal input section n1 supplies the series signal input via a signal input terminal n1a to the quantizer n2. The quantizer n2 quantizes the received series signal and outputs the results to the path selecting section n3. The path selecting section n3 has an input terminal connected to the output of the quantizer n2, a path input terminal n3a, and path output terminals n3b1 to n3b3. The path input terminal n3a and the path output terminals n3b1 to n3b3 are connected with other terminals when a plurality of recognition units are interconnected to construct a network. The degree of the connection between the path input terminal n3a and the path output terminals n3b1 to n3b3 may be changed depending on a value input from the quantizer n2.

Figure 5:
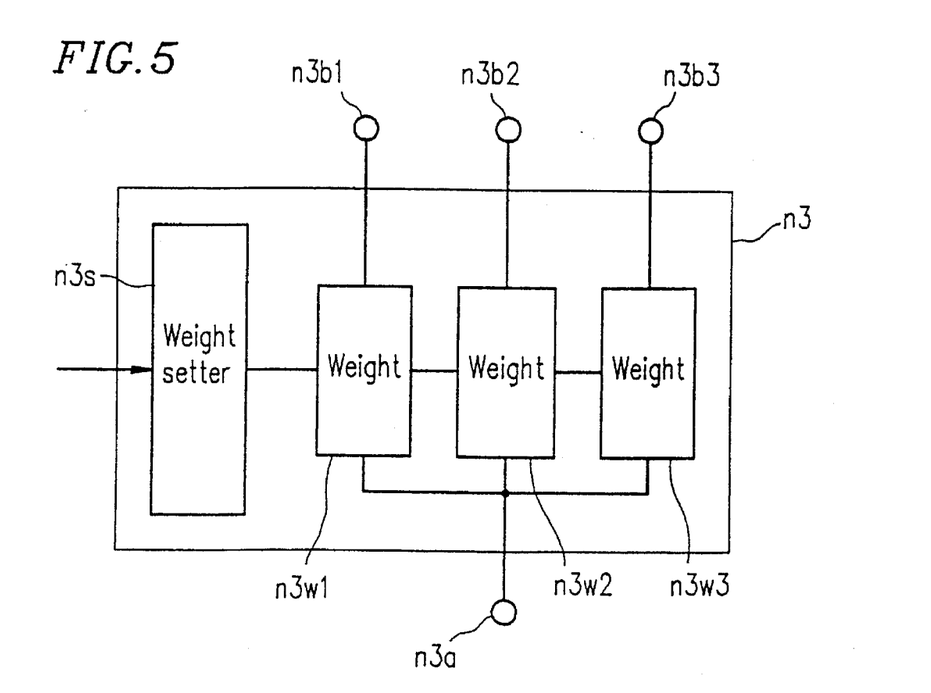
FIG. 5 schematically shows an example of a path selecting section of the learning type waveform converting section of the learning type signal recording and reproducing apparatus of the present invention.

FIG. 5 shows an exemplary configuration of the path selecting section n3 in more detail. The path selecting section n3 includes one path input terminal n3a, three path output terminals n3b1, n3b2, and n3b3, weights n3w1, n3w2, and n3w3 for the connection between the path input terminal n3a and the respective path output terminals n3b1, n3b2, and n3b3, and a weight setter n3s for setting the weights. The weights n3w1, n3w2, and n3w3 are weights by which the signal input from the path input terminal n3a is multiplied. The results of the multiplication are output from the path output terminals n3b1, n3b2, and n3b3. The weight setter n3s sets the weights n3w1, n3w2, and n3w3 so that the connection between the path input terminal n3a and the path output terminal specified by the value output from the quantizer n2 is strongest among the connections between the path input terminal n3a and the path output terminals n3b1, n3b2, and n3b3.

The number of path input terminals and the number of path output terminals of each recognition unit of the second layer is not limited to the above numbers. These numbers can be determined depending on the number of layers included in the entire network and the number of signals in one series.

Figure 6:
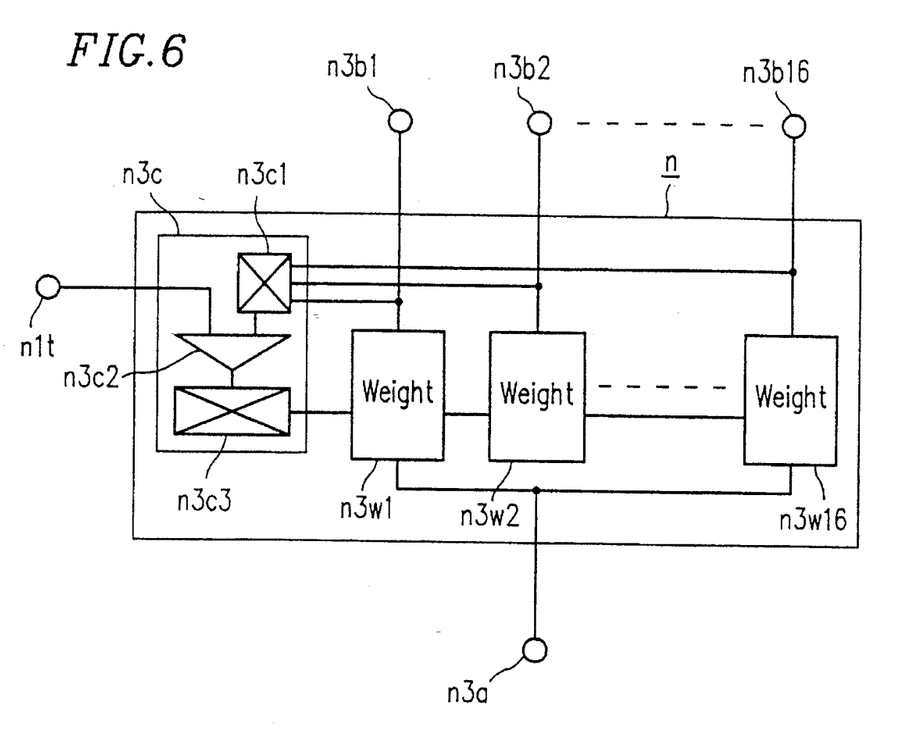
FIG. 6 schematically shows an example of a recognition unit of a third layer of the learning type waveform converting section of the learning type signal recording and reproducing apparatus of the present invention.

Next, the configuration of the recognition unit of the third layer of the network will be described.

FIG. 6 shows the configuration of the recognition unit n of the third layer. All of the recognition units included in the third layer have the configuration shown in FIG. 6. The recognition unit n has a path input terminal n3a, path output terminals n3b1 to n3b16, and weights n3w1 to n3w16 for changing the strength of the connection between the path input terminal n3a and the respective path output terminals n3b1 to n3b16. The signal input from the path input terminal n3a is multiplied by the weights n3w1 to n3w16, and the results are output from the respective path output terminals n3b1 to n3b16.

The recognition units of the third layer further include a teacher signal input terminal n1t, through which a waveform signal number ("0" or "1") to be learned, i.e., the unit number of the recognition unit p1 or p2 of the fourth layer, is input as the teacher signal in the learning process. The "learning process" as used herein refers to a process where, for example, the teacher signal recorded on the header portion of the recording medium is detected and the relationship between a variation in the signal level of the detected teacher signal and the reference teacher signal output from the teacher signal generator 3 is learned so as to establish a conversion rule. Thus, the reference teacher signal from the teacher signal generator 3 is input into the teacher signal input terminal n1t. The teacher signal input from the teacher signal input terminal n1t is supplied to a path learner n3c. The path learner n3c changes the weights n3w1 to n3w16 based on the teacher signal in the learning process, so as to make the connection between the path input terminal n3a and the path output terminal specified by the teacher signal strongest.

No signal is input into the teacher signal input terminal n1t in the actual recognition process, i.e., the process where the signal corresponding to normal data is actually reproduced by use of the established conversion rule. Therefore, the weights n3w1 to n3w16 are not changed by the path learner n3c, but the weights set in the learning process are maintained. Thus, the path signal input from the path input terminal n3a is output from the path output terminals n3b1 to n3b16 after being multiplied by the respective weights. The weights n3w1 to n3w16 obtained in the learning process are stored in the nonvolatile memory 4 under the control of the memory control section 21 and kept therein until the weights n3w1 to n3w16 are renewed. The weights n3w1 to n3w16 stored in the nonvolatile memory 4 can also be loaded under the control of the memory control section 21.

The path learner n3c will be schematically described. As shown in FIG. 6, the path learner n3c includes a maximum output terminal detector n3c1, a comparative judging section n3c2, and a weight changer n3c3. The maximum output terminal detector n3c1 detects among the path output terminals n3b1 to n3b16 a path output terminal which has the maximum output, and supplies the detection result to the comparative judging section n3c2. The comparative judging section n3c2 compares the detection result output from the maximum output terminal detector n3c1 with the teacher signal input via the teacher signal input terminal nt1 in the learning process. More specifically, the comparative judging section n3c2 compares the number of the path output terminal indicated by the detection result output from the maximum output terminal detector n3c1 with the number of the path output terminal specified by the teacher signal. The comparative judging section n3c2 outputs "0" when the two output terminal numbers are not the same, while it outputs "1" when they are the same. The output of the comparative judging section n3c2, "0" or "1", is supplied to the weight changer n3c3. The weight changer n3c3 increases the weight of one of the weights n3w1 to n3w16 corresponding to the path output terminal specified by the teacher signal so that the connection between the path input terminal n3a and the specified path output terminal is strongest among the connections between the path input terminal n3a and the path output terminals n3b1 to n3b16, i.e., so that the corresponding weight is the largest among the weights n3w1 to n3w16.

Accordingly, when the comparative judging section n3c2 outputs "1", which indicates that the connection between the path output terminal specified by the teacher signal and the path input terminal is strongest, it is not necessary to change the weight. On the contrary, when the comparative judging section n3c2 outputs "0", which indicates that there exists another path output terminal which is connected with the path input terminal more strongly than the path output terminal specified by the teacher signal. In this case, the weight changer n3c3 changes the weight so that the detection result output from the maximum output terminal detector n3c1 is identical to the teacher signal.

Figure 7:
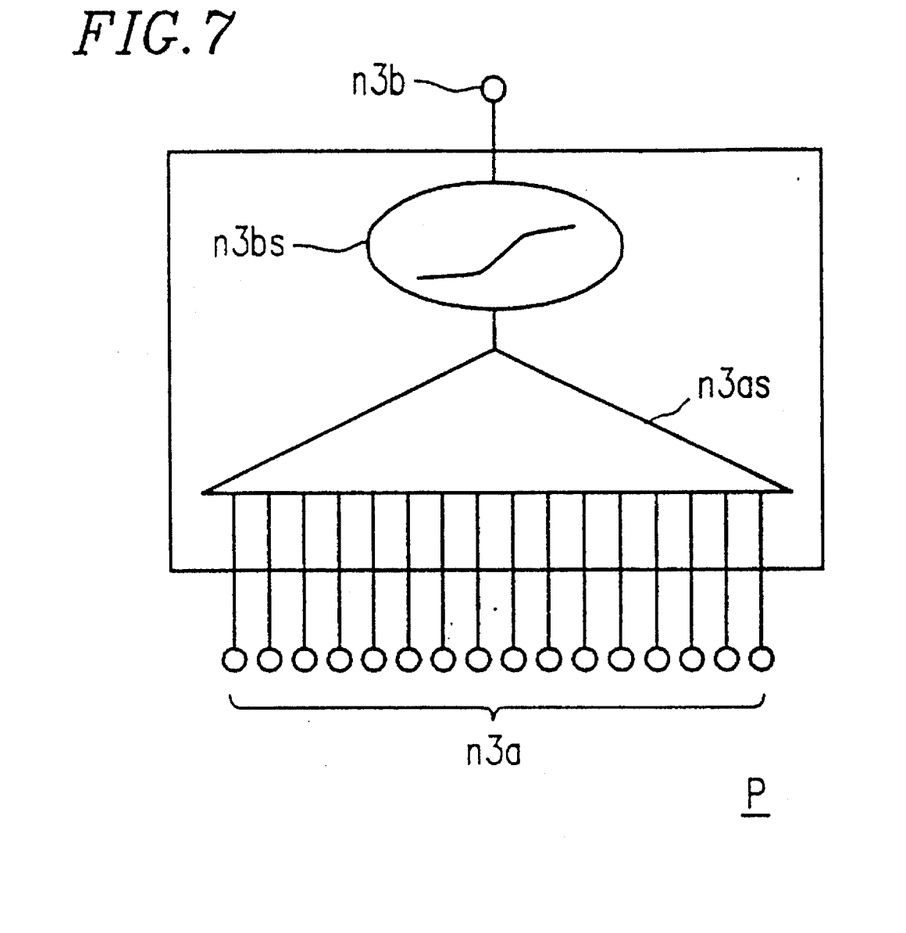
FIG. 7 schematically shows an example of a recognition unit of a fourth layer of the learning type waveform converting section of the learning type signal recording and reproducing apparatus of the present invention.

FIG. 7 shows the configuration of the recognition units p1 and p2 of the fourth layer. Each of the recognition units p1 and p2 includes a plurality of path input terminals n3a, one output terminal n3b, an adder n3as for adding the inputs from the input terminals n3a, and a threshold processor n3bs for thresholding the output from the adder n3as and outputting the result to the output terminal n3b. A sigmoid function, a step function, and the like may be used as a function for the threshold processing by the threshold processor n3bs.

Next, the learning operation of the learning type waveform converting section 2 having the four-layer network described above will be described.

First, the path signal 1 is supplied to the path input terminal n3a of the recognition unit n of the second layer.

The five series signals s(t) and ds(t1) to ds(t4) are input into the five recognition units of the first layer, respectively. Each of these series signals is then supplied to the quantizer n2 of the corresponding recognition unit n of the second layer. The quantizer n2 quantizes the received series signals and, based on the quantized values, sets the weights n3w1, n3wb, and n3w3 which are weights for the connection between the recognition unit of the second layer and the recognition unit of the third layer. As a result, the path output terminals n3b1, n3b2, and n3b3 of the recognition unit n of the second layer output path signals obtained by multiplying the path signal "1" supplied to the path input terminal n3a by the corresponding weights.

Each of the path signals output from the path output terminals n3b1, n3b2, and n3b3 of the recognition unit of the second layer is then supplied to the path input terminal n3a of the corresponding recognition units of the third layer. Each of the recognition units of the third layer multiplies the path signal input via the path input terminal n3a by the weights n3w1 to n3w16 which have already been set, and outputs the results to the recognition units of the fourth layer via the path output terminals n3b1 to n3b16. At this time, the maximum output terminal detector n3c1 of the recognition unit of the third layer detects the number of the path output terminal having the maximum output, and supplies the result to the comparative judging section n3c2. Simultaneously, the comparative judging section n3c2 receives the teaching signal indicating the number of a waveform to be learned, i.e., which recognition unit of the fourth layer, p1 or p2 should generate an output via the teacher input terminal nt1. The comparative judging section n3c2 judges which one of the path output terminals should have the largest output based on the supplied teacher signal, and compares the number of the output terminal indicated by the teacher signal with the number of the path output terminal detected by the maximum output terminal detector n3c1. The comparative judging section n3c2 outputs "0" to the weight changer n3c3 when the two numbers are not the same, while it outputs "1" when they are the same.

When the weight changer n3c3 receives "0", i.e., when the path output terminal having the maximum output and the path output terminal specified by the teacher signal are different, it strengthens the connection between the path input terminal n3a and the path output terminal specified by the teacher signal, i.e., the weight corresponding to the specified path output terminal is increased. Thus, in each unit recognition unit in the third layer, the path learner n3c learns the weight by which the path output terminal having the maximum output and the path output terminal specified by the teacher signal can be made identical to each other. Upon completion of the learning, the resultant weights n3w1 to n3w16 are stored in the nonvolatile memory 4 via the memory control section 21 as the conversion rule for obtaining the originally recorded signal from the detected signal.

As described above, in the learning process by the learning type waveform converting section 2, each recognition unit of the second layer quantizes the corresponding series signal input through the signal input terminal n1a via the input terminal of the first layer, and determines the degree of the connection thereof with the recognition units of the upper layer based on the quantized value. Each recognition unit of the third layer only changes the strength of the connection between the path input terminal and the path output terminal based on the teacher signal supplied thereto using the path learner. Accordingly, significantly high-speed learning is possible.

Next, the actual waveform converting operation performed by the learning type waveform converting section 2 will be described.

The operation covering the steps where the information signal corresponding to the actual data recorded on the portion after the header portion of the recording medium is detected by the signal detector 7 and then input into the learning type waveform converting section 2 via the series signal extracting section 1 is the same as that in the learning process.

First, the path signal "1" is supplied to the path input terminal n3a of the recognition unit n of the second layer. Each of the five series signals s(t) and ds(t1) to ds(t4) extracted by the series signal extracting section 1 is input into the corresponding signal input terminal n1a of each recognition unit of the second layer via the corresponding recognition unit of the first layer. The quantizer n2 of each recognition unit of the second layer quantizes the input series signal. Based on the quantized values, the path selecting section n3 sets the weights n3w1 to n3w3 for the connection of the recognition unit with the upper recognition unit. Path signals obtained by multiplying the path signal supplied from the path input terminal n1a by the weights n3w1 to n3w3 are output to the path input terminals of the recognition units of the third layer via the respective path output terminals n3b1 to n3b3.

No teacher signal is input into the recognition units of the third layer at the actual waveform converting operation. Accordingly, the weights n3w1 to n3w16 keep the values obtained in the learning process, and the path signal supplied from the path input terminal n3a is multiplied by the weights. The weighed signals are then output from the path output terminals n3b1 to n3b16 to be supplied to the path input terminal n3a of each recognition unit of the fourth layer.

The adder n3as of the path input section of each recognition unit of the fourth layer adds all path signals input thereto and supplies the result to the threshold processor n3bs. The threshold processor n3bs thresholds the output from the adder n3as and outputs the result to the output terminal n3b. When the value obtained by this addition is greater than a predetermined threshold, the recognition unit outputs a value. More specifically, the recognition units p1 and p2 output the degree of probability with which the input series signals are likely to be "0" and "1", respectively.

The outputs of the recognition units p1 and p2 are input into the output judging section 20. The output judging section 20 compares the output value of the recognition unit p1 with the output value of the recognition unit p2, and outputs "0" when p1>p2 and otherwise outputs "1" as the final result.

Thus, according to this example, in the learning type waveform converting section 2, each recognition unit of the second layer quantizes the series signal input into the signal input terminal n1a thereof via the input terminal of the first layer, and sets the degree of the connection thereof with the recognition units in the upper layer based on the quantized values. Each recognition unit of the third layer only multiplies the path signal input from the path input terminal n3a by the weights set in the learning process. The weighed path signals are output to each recognition unit of the fourth layer via the path output terminals n3b1 to n3b16. Accordingly, significantly high-speed and accurate threshold processing of input series signals can be realized based on the learning results.

The above-described learning operation and waveform converting operation are switched by a controller not shown. For example, the teacher signal generator 3 is controlled by the controller so as to supply the reference teacher signal to the learning type waveform converting section 2 only when the signal recorded on the header portion is detected. If the reference teacher signal is not supplied to the learning type waveform converting section 2, the weights in each unit of the third layer will not be changed. Accordingly, by the above control, the learning operation and the waveform converting operation can be switched automatically.

As described above, in the learning type signal recording and reproducing apparatus of the present invention, the teacher signal generator generates a teacher signal, which is recorded on a header portion of a recording medium prior to the recording of data proper to be recorded. At reproduction, the teacher signal recorded on the header portion of the recording medium is first detected, and the relationship between the detected teacher signal and the teacher signal generated by the teacher signal generator is learned. By this learning, a conversion rule for converting the detected signal into the signal originally recorded is automatically established. In this example, the weights of each recognition unit correspond to the conversion rule. By using the conversion rule established by the learning, signals recorded after the heading portion are converted into reproduction signals. As a result, even when a signal having distortion due to noise, the difference between recording media used, and the like is detected, an accurate reproduction signal can be obtained.

Moreover, in the learning type signal recording and reproducing apparatus of the present invention, a conversion rule established by learning is stored in a nonvolatile memory. At the next reproduction, learning can be started after the stored conversion rule is loaded from the nonvolatile memory, i.e., based on the conditions set by the previous learning. As a result, the learning is finished faster, and thus the start-up time of the signal recording and reproducing apparatus can be made significantly shorter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal recording and reproducing apparatus comprising:
   signal detecting means for detecting a teacher signal and an information signal recorded on a recording medium;
   converting means for converting the teacher signal and the information signal detected by the signal detecting means into a reproduction teacher signal and a reproduction information signal, respectively, based on a predetermined conversion rule; and
   teacher signal generating means for generating a reference teacher signal,
   wherein the teacher signal is first detected before the detection of the information signal, and the converting means includes a learning type waveform converting section for automatically establishing the predetermined conversion rule based on the reproduction teacher signal and the reference teacher signal.

2. A signal recording and reproducing apparatus according to claim 1, wherein the converting means includes memory means for storing the predetermined conversion rule established by the learning type waveform converting section.

3. A signal recording and reproducing apparatus according to claim 2, wherein the converting means further includes a series signal extracting section for extracting a variation in a signal value at various points on a transition axis of the detected teacher signal and outputting the extracted variation in the signal value as series signals, and a memory control section for controlling the storage of the predetermined conversion rule in the memory means, and
   the learning type waveform converting section automatically establishes the predetermined conversion rule by learning the relationship between the extracted variation in the signal value and the waveform of the reference teacher signal.

4. A signal recording and reproducing apparatus according to claim 3, wherein, when another conversion rule has been stored in the memory means, the conversion rule is loaded by the memory control section, the detected teacher signal is converted into the reproduction teacher signal in accordance with the conversion rule, and the predetermined conversion rule is established based on the reproduction teacher signal and the reference teacher signal.

5. A signal recording and reproducing apparatus according to claim 3, wherein the learning type waveform converting section includes a network having a plurality of layers, at least one of the plurality of layers including a plurality of first recognition units each having:
   a signal input section for receiving one of the series signals;
   a quantizer for receiving and quantizing the one of the series signals from the signal input section;
   at least one first path input terminal;
   at least one first path output terminal connected to the at least one first path input terminal; and
   a path selecting section for selecting a path by changing a degree of a connection between the at least one first path input terminal and the at least one first path output terminal in accordance with the quantized one of the series signals,
   a layer immediately before an output layer of the plurality of layers including a plurality of second recognition units each having:
   a teacher signal input terminal for receiving the reference teacher signal;
   at least one second path input terminal;
   at least one second path output terminal connected to the at least one second path input terminal; and
   a path learner for changing a strength of a connection between the at least one second path input terminal and one of the at least one second path output terminal specified by the reference teacher signal, and
   the learning type waveform converting section further includes an output result judging section for detecting a recognition unit having a largest output value among a plurality of third recognition units included in the output layer of the plurality of layers.

6. A signal recording and reproducing apparatus according to claim 5, wherein the series signal extracting section includes:
   a current signal extracting section for extracting a signal value at a predetermined point on the transition axis of the teacher signal; and
   a variation extracting section for calculating the difference between the signal value at the predetermined point extracted by the current signal extracting section and a signal value of the teacher signal at a point before the predetermine point.

7. A signal recording and reproducing apparatus according to claim 6, wherein the degree of the connection between the adjacent layers is changed by changing a strength of a connection between a unit included in one of the adjacent layers and a unit included in the other layer.

8. A signal recording and reproducing apparatus according to claim 7, wherein the network of a plurality of layers has first, second, third, and fourth layers arranged in this order, the first layer receives the detected teacher signal, the fourth layer outputs the reproduction teacher signal, and the reference teacher signal is supplied to a unit included in the third layer, whereby the strength of the connection between the unit included in the third layer and a unit included in the fourth layer is changed.

9. A signal recording and reproducing apparatus according to claim 8, wherein the strength of the connection between the unit included in the third layer and the unit included in the fourth layer is changed so that the reproduction teacher signal and the reference teacher signal are substantially the same.

10. A signal recording and reproducing apparatus according to claim 5, wherein the degree of the connection between the at least one second path input terminal and the at least one second path output terminal in the plurality of second recognition units of the learning type waveform converting section is stored in the memory means as the predetermined conversion rule.

11. A signal recording and reproducing apparatus according to claim 10, wherein the series signal extracting section generates further series signals by extracting a variation in a signal value at various points on a transition axis of the detected information signal,
   when the information signal is detected, the memory control section of the learning type waveform converting section loads the predetermined conversion rule stored in the memory means, and in each of the plurality of first recognition units, the signal input section receives one of the further series signals, the quantizer quantizes the one of the further series signals, and the path setting section changes the connection between the at least one first path input terminal and the at least one first path output terminal in accordance with the quantized one of the further series signal, while in each of the plurality of second recognition units, the at least one second path input terminal and the at least one second path output terminal are connected in a degree indicated by the predetermined conversion rule, whereby the information signal is converted into the reproduction information signal in accordance with the predetermined rule.

12. A signal recording and reproducing apparatus according to claim 3, wherein the series signal extracting section includes:

a current signal extracting section for extracting a signal value at a predetermined point on the transition axis of the teacher signal; and a variation extracting section for calculating the difference between the signal value at the predetermined point extracted by the current signal extracting section and a signal value of the teacher signal at a point before the predetermined point.

13. A signal recording and reproducing apparatus according to claim 2, wherein, when another conversion rule has been stored in the memory means, the learning type waveform converting section converts the detected teacher signal into the reproduction teacher signal in accordance with the conversion rule stored in the memory means, and establishes the predetermined conversion rule based on the reproduction teacher signal and the reference teacher signal.

14. A signal recording and reproducing apparatus according to claim 13, wherein the converting means further includes comparing means for comparing the reproduction teacher signal and the reference teacher signal, and the memory means stores the predetermined conversion rule when the reproduction teacher signal and the reference teacher signal are substantially the same.

15. A signal recording and reproducing apparatus according to claim 2, wherein the converting means further includes comparing means for comparing the reproduction teacher signal and the reference teacher signal, and the memory means stores the predetermined conversion rule when the reproduction teacher signal and the reference teacher signal are substantially the same.

16. A signal recording and reproducing apparatus according to claim 2, wherein the learning type converting section includes a network made of a plurality of layers each having a plurality of units, and the predetermined conversion rule is established by changing a degree of a connection between adjacent layers among the plurality of layers by a learning operation performed by use of the reproduction teacher signal and the reference teacher signal.

17. A signal recording and reproducing apparatus according to claim 16, wherein the predetermined conversion rule is stored in the memory means as the degree of the connection between the adjacent layers.

18. A signal recording and reproducing apparatus according to claim 1, wherein the learning type waveform converting section includes a network made of a plurality of layers each having a plurality of units, and the predetermined conversion rule is established by changing a strength of a connection between adjacent layers among the plurality of layers by a learning operation performed by use of the reproduction teacher signal and the reference teacher signal.

19. A signal recording and reproducing apparatus according to claim 1, wherein, when data is to be recorded on the recording medium, the reference teacher signal generated by the teacher signal generating means is first recorded before the recording of the data.

* * * * *